United States Patent [19]

Keller

[11] Patent Number: 5,462,317
[45] Date of Patent: Oct. 31, 1995

[54] ADAPTER FOR A MIXING OR DISPENSING DEVICE

[76] Inventor: Wilhelm A. Keller, Obstgartenweg 9, CH-6402 Merlischachen, Switzerland

[21] Appl. No.: 216,328

[22] Filed: Mar. 23, 1994

[51] Int. Cl.⁶ .............................. F16L 25/00; B65D 5/72
[52] U.S. Cl. ..................... 285/177; 285/332.4; 285/333; 222/568; 222/566
[58] Field of Search ..................... 285/251, 177, 285/176, 332.4, 333; 222/568, 567, 566, 570

[56] References Cited

U.S. PATENT DOCUMENTS

| | | | |
|---|---|---|---|
| 1,222,088 | 4/1917 | Evans, Sr. | 285/251 |
| 2,009,679 | 7/1935 | Placide | 285/251 |
| 2,399,791 | 5/1946 | Conroy | 285/251 |
| 3,032,358 | 5/1962 | Rolston | 285/251 |
| 3,169,562 | 2/1965 | Gogel | 285/177 |
| 3,680,896 | 8/1972 | Cupit | 285/177 |
| 3,726,547 | 4/1973 | Cox, Jr. | 285/251 |
| 4,258,884 | 3/1981 | Rogers | 222/570 |
| 4,266,813 | 5/1981 | Oliver | 285/177 |
| 4,611,828 | 9/1986 | Brunet | 285/251 |
| 4,688,833 | 8/1987 | Todd | 285/177 |
| 4,957,225 | 9/1990 | Childers | 222/568 |
| 4,995,540 | 2/1991 | Colin et al. | 222/567 |
| 5,104,013 | 4/1992 | Hawley | 222/568 |
| 5,248,071 | 9/1993 | Ray | 222/568 |
| 5,249,716 | 10/1993 | O'Sullivan | 222/568 |
| 5,275,447 | 1/1994 | McNab | 288/177 |
| 5,346,380 | 9/1994 | Ables | 222/568 |

*Primary Examiner*—Eric K. Nicholson
*Attorney, Agent, or Firm*—Marks & Murase

[57] ABSTRACT

The adapter for attachment onto an outlet of a dispensing means such as a mixing device, comprises a connecting part for attachment to the outlet and an outlet portion to which other parts can be connected or which can be a formed outlet itself. This connecting part comprises a cylindrical or an approximately frusto-conical internal surface part having a self-cutting thread for attachment onto an external surface of the outlet of a mixing device or other dispensing device. Such an adapter can be easily attached to the outlet of a standard static or dynamic mixer or other dispensing device having a stepped external surface, thus eliminating the need to keep an inventory of mixers with different outlets or outlet connections.

17 Claims, 3 Drawing Sheets

ADAPTER FOR A MIXING OR DISPENSING DEVICE

BACKGROUND OF THE INVENTION

The present invention refers to an adapter, in particular to an adapter of the LUER lock type. Adapters of the LUER lock type are known, in particular for adapting a hollow needle or other tip on the nozzle of a dispensing apparatus or its following mixing device. Such known needles, tips or other devices, however, have a particular connecting part, necessitating a corresponding particularly formed end piece on the nozzle. This obligation to use exactly corresponding pieces limits severely the utility of such needles or tips in connection with static mixers or other dispensing nozzles and leads to multiple storage of mixing devices or other dispensing devices with regular outlet ends and such with Luer lock or other special connection ends.

SUMMARY OF THE INVENTION

It is, based on this prior art, the purpose of this invention to disclose an adapter which can be fastened on different kinds and forms, in general standardized outlets of mixers and other dispensing devices without exactly corresponding connecting parts. This purpose is achieved with an adapter to be adapted onto an outlet of a mixing device or other dispensing device, comprising a connecting part for the attachment to the said outlet and a front part for receiving further outlet means or being arranged as outlet means, wherein said connecting part comprises a preferably approximately frusto-conical internal surface having a self-cutting thread for attachment onto an external surface of said outlet of a mixer or other dispensing device.

BRIEF DESCRIPTION OF THE DRAWINGS

The invention is explained in more detail hereinafter with reference to a drawing of embodiments.

DETAILED DESCRIPTION OF THE INVENTION

Figure 1:
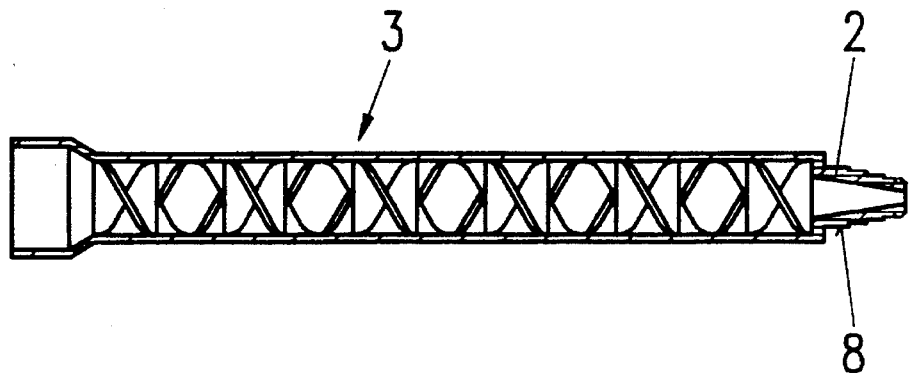
FIG. 1 shows in a sectional view a static mixer.

FIG. 1 shows a static mixer 3 according to the state of the art and in commerce for many years, having an outlet end 2 with a stepped external surface 8, having several steps, for example four steps.

Figure 2:
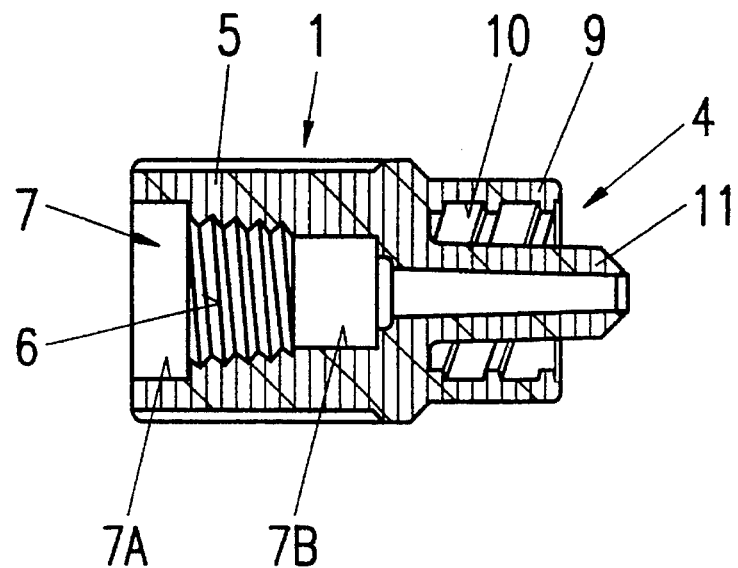
FIG. 2 shows in a sectional view a first embodiment of an adapter according to the invention.

FIG. 2 shows a first embodiment of an adapter 1. Whilst the outlet portion 4 of this first embodiment is similar to a LUER lock type socket, the inner surface 7 of its connecting part 5 is in difference to the known adapters provided with a frusto-conical part having a self-cutting thread 6 and is shaped similarly to the stepped external surface 8 of the mixing device, the self-cutting thread 6 being located at the central part of the inner surface 7. This allows an exact guiding of the adapter by its portions 7A and 7B of the inner surface adjacent to the threaded part 6 on the corresponding stepped sections of the external surface 8 of the mixing device. Preferably, the adapter according to the invention is injection molded and made of a harder plastics material than the material of the outlet the adapter is to be fitted on.

The outlet portion 4 of this embodiment of an adapter which is the same as known from the LUER lock adapter, comprises an outlet piece 9 with an internal thread 10 and a slightly conical central tip 11, this outlet portion 4 being designed for receiving a hollow needle, or any other objects known to be connected to this kind of LUER lock adapter. Instead of the shown Luer lock device a thread or a bayonet type connection can be used, the outlet portion comprising in this case the socket part of it.

Figure 3:
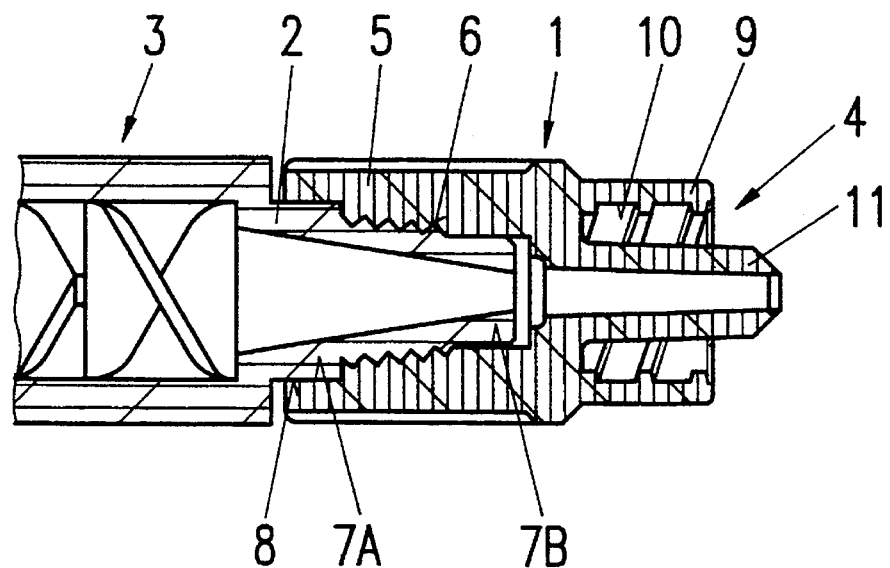
FIG. 3 shows in a sectional view the adapter of FIG. 2 on the outlet of the static mixer of FIG. 1.

FIG. 3 shows the adapter 1 of FIG. 2 fastened to the static mixer 3 of FIG. 1 wherein the self-cutting thread 6 has cut a corresponding thread into the external stepped surface 8 of the static mixer 1.

Figure 4:
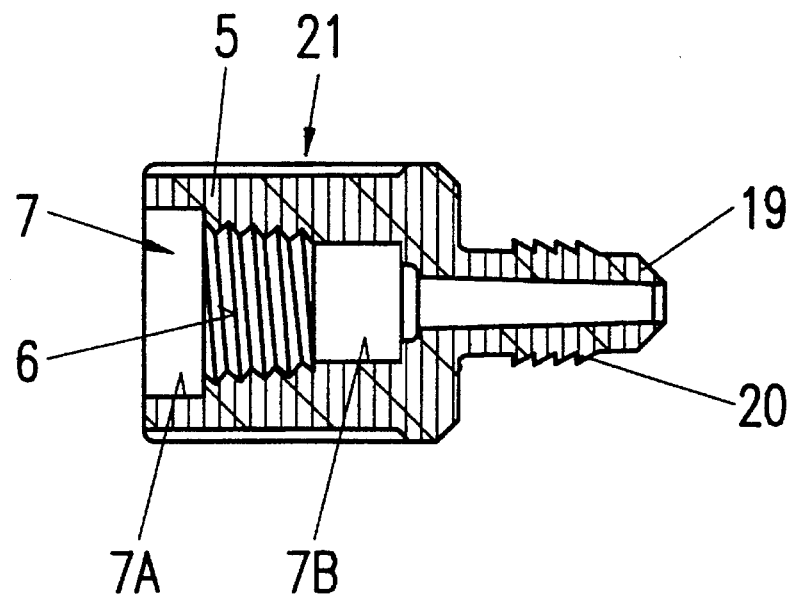
FIG. 4 shows in a sectional view a second embodiment of an adapter according to the invention.

FIG. 4 shows a second embodiment of the invention wherein the outlet tip 19 is provided with retaining ribs 20 for the attachment of a hose or the like conducting means. The other parts of the adapter 21 may be the same as in FIG. 1.

Figure 5A:
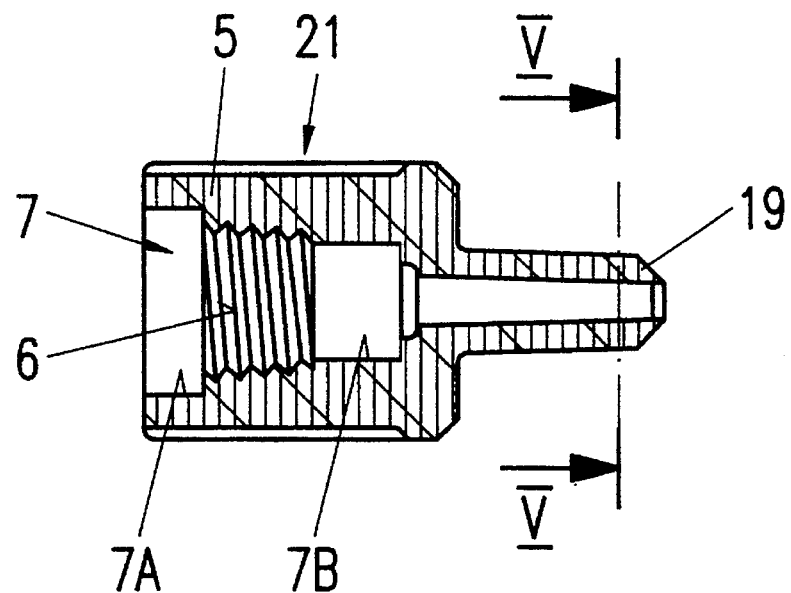
FIG. 5A shows in a sectional view a variant of the adapter of FIG. 4.

FIG. 5A shows a variant of the embodiment of FIG. 4 wherein the outlet tip 19 has no retaining ribs but is nevertheless also adapted for the attachment of a hose or the like conducting means. The other parts of the adapter 21 may be the same as in FIG. 1.

Figure 5B:
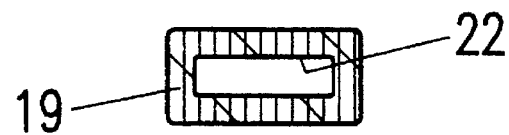
FIG. 5B shows a cross-section according to the line V—V in FIG. 5A.

FIG. 5B is a cross-section of tip 19 of FIG. 5A and illustrates that the cross-section of the opening 22 of outlet tip 19 of the adapter, or of a tip fixed thereon, need not to be circular and can be either rectangular as shown or have any other cross-section like triangular, square, oval or have any other shape.

Figure 6:
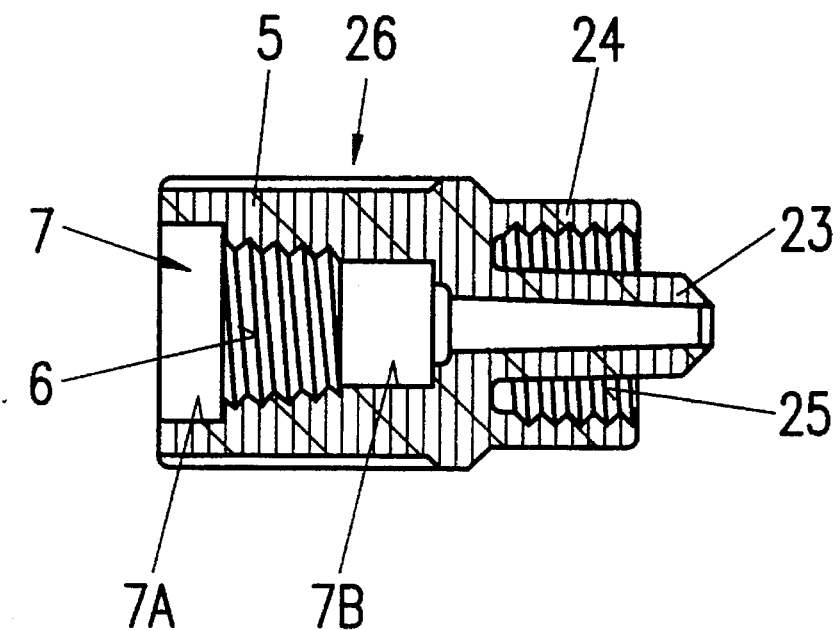
FIG. 6 shows a variant of the adapter of FIG. 2.

FIG. 6 shows a third embodiment of the invention as variant of FIG. 1 and 2 in that the central outlet tip 23 is not provided with retaining ribs. For the attachment of a hose or the like the internal surface of outlet piece 24 is provided with an internal thread 25, which could be replaced by a socket for a bayonet type connection. The other parts of the adapter 26 may be the same as in FIG. 1.

Figure 7:
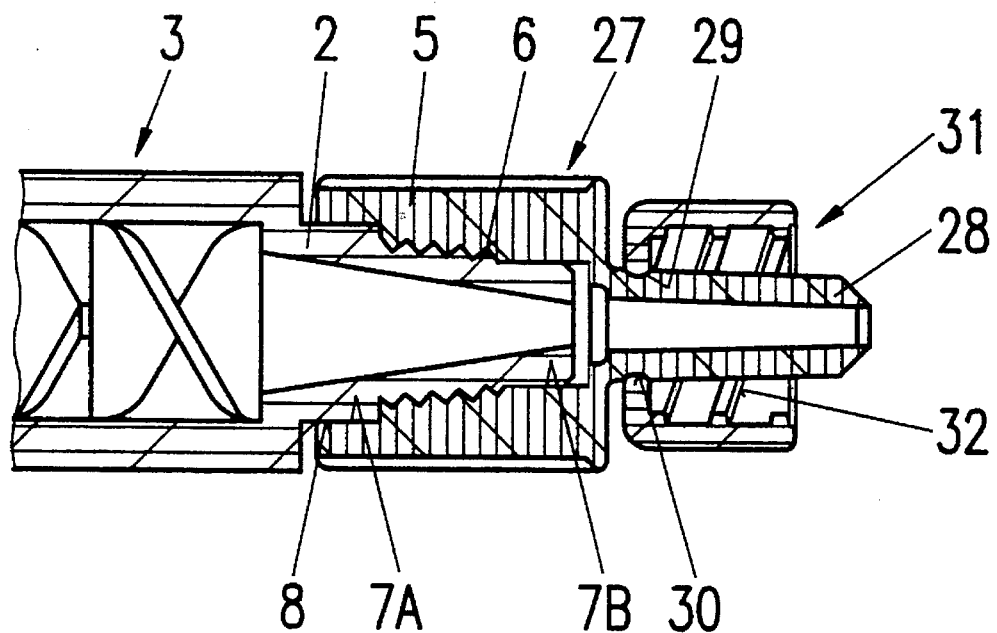
FIG. 7 shows in a sectional view a fourth embodiment of an adapter according to the invention on the outlet of the static mixer of FIG. 1.

FIG. 7 shows a fourth embodiment of the adapter according to the invention, also fastened to the outlet of a mixing device 3. The connecting part 5 of adapter 27 is the same as of the previously shown adapters, whereas its outlet portion comprises a central tip 28 having near the connecting part a circular groove 29 for receiving the end 30 of a snap-on retaining ring 31 having an internal thread 32, which could also be replaced by a socket for a bayonet type connection. The snap on retaining ring allows the fastening of a hollow needle or other outlet devices as according to the first embodiment.

Instead of the said snap-on ring other parts may be received by the circular groove, in particular different tips as disclosed in the European Patent Application No. 579,889 of the same applicant. In this embodiment the outlet portion can also be provided instead of an internal thread 32 with a socket for a bayonet type connection.

It is understood that the connecting part of the adapter need not necessarily have the exact shape as shown in the Figures. Thus, the internal self-cutting thread which is generally provided on a frusto-conical internal surface part could also be applied on a cylindrical internal surface part. Moreover, the adapter which is particularly suited for a standardized stepped external surface of a static mixer with cylindrical steps, can also be fastened on a generally slightly conical surface having less pronounced steps or only one step. Also there need not be necessarily two guiding surfaces 7A and 7B, one of it or even both may be ommited. Said guiding surfaces are, if adapted to the stepped external surface of the mixer outlet also cylindrical, but in a variant said guiding surfaces may by slightly conical.

It follows from the description of the embodiments that such an adapter can be easily attached to a great variety of outlets of dispensing apparatus or in particular to the outlet end of static or dynamic mixers or the like, whereby the outlet portion of the adapter can be conceived independently from its connecting part, thus enabling a greater variation of use of different kinds of outlet attachments or cross-sections without the necessity to have on inventory a great number of static mixers or other dispensing devices with different end configurations.

I claim:

1. An adapter for attachment to an outlet of a device selected from the group consisting of a mixing device and a dispensing device, comprising a connecting part for attachment to said outlet and an outlet portion, wherein said outlet has an external stepped surface, wherein said connecting part comprises an approximately frusto-conical internal surface part having a self-cutting thread for attachment onto the external surface of said outlet of said device, wherein the connecting part has an internal surface which is stepped, and wherein the self-cutting thread has a central region with at least one adjacent stepped part acting as a guide for cooperating with the external stepped surface of said outlet.

2. The adapter of claim 1, being injection molded of a harder plastics material than said outlet of said device.

3. The adapter of claim 1, wherein the outlet portion of the adapter is a socket part of a LUER lock adapter.

4. The adapter of claim 1 for a static mixer, wherein the connecting part of the adapter is provided with a frusto-conical internal surface part having a self-cutting thread and two adjacent guiding parts and wherein the outlet portion of the adapter is a socket part of a LUER lock adapter.

5. The adapter of claim 1, wherein said outlet portion comprises an outlet tip having retaining ribs for the attachment of a hose.

6. The adapter of claim 5, wherein said outlet portion is designed for attachment of a conducting means, said outlet portion comprising a central outlet tip and concentrical thereto an outlet piece.

7. The adapter of claim 1, wherein said outlet portion comprises a central tip formed as an outlet having a circular groove for receiving a snap-on attachment means.

8. The adapter of claim 1, wherein said outlet portion comprises a central tip formed as an outlet having a circular groove on which a snap-on retaining ring is removably fastened, said ring having an outlet end.

9. The adapter of claim 1, wherein said outlet portion has an opening having a cross-section which is a shape selected from the group consisting of cylindrical, rectangular, square, triangular and oval.

10. The adapter of claim 6, wherein said outlet piece has an internal thread.

11. The adapter of claim 6, wherein said outlet piece is formed as a socket for a bayonet type connection.

12. The adapter of claim 6, wherein said conducting means comprises a hose.

13. The adapter of claim 8, wherein said outlet end has an internal thread.

14. The adapter of claim 8, wherein said outlet end is formed as a socket for a bayonet type connection.

15. The adapter of claim 1, wherein said outlet portion receives a further outlet means.

16. The adapter of claim 1, wherein said outlet portion is formed as an outlet.

17. The adapter of claim 15, wherein said further outlet means has an opening having a cross-section which is a shape selected from the group consisting of cylindrical, rectangular, square, triangular and oval.

* * * * *